United States Patent
Staudenmaier et al.

(10) Patent No.: US 9,607,583 B2
(45) Date of Patent: Mar. 28, 2017

(54) DISPLAY CONTROLLER DEVICE HAVING A DEBUG INTERFACE

(71) Applicants: Michael Andreas Staudenmaier, Munich (DE); Vincent Aubineau, Areches (FR); Yves Briant, Bures sur Yvette (FR)

(72) Inventors: Michael Andreas Staudenmaier, Munich (DE); Vincent Aubineau, Areches (FR); Yves Briant, Bures sur Yvette (FR)

(73) Assignee: NXP USA, INC., Austin, TX (US)

( * ) Notice: Subject to any disclaimer, the term of this patent is extended or adjusted under 35 U.S.C. 154(b) by 157 days.

(21) Appl. No.: 14/614,517

(22) Filed: Feb. 5, 2015

(65) Prior Publication Data
US 2016/0071495 A1    Mar. 10, 2016

(30) Foreign Application Priority Data

Sep. 5, 2014  (WO) .................. PCT/IB2014/002106

(51) Int. Cl.
*G09G 5/36* (2006.01)
*G09G 5/12* (2006.01)
(Continued)

(52) U.S. Cl.
CPC .............. *G09G 5/363* (2013.01); *G06F 3/14* (2013.01); *G09G 3/20* (2013.01); *G09G 5/00* (2013.01);
(Continued)

(58) Field of Classification Search
None
See application file for complete search history.

(56) References Cited

U.S. PATENT DOCUMENTS 5,848,264 A * 12/1998 Baird .................. G06F 11/3656
                                                                703/28
7,986,313 B2 * 7/2011 Krah .................... G01R 31/046
                                                                178/18.01
(Continued)

FOREIGN PATENT DOCUMENTS

CN        102636209 A    8/2012
EP        0661684 A2     7/1995
(Continued)

OTHER PUBLICATIONS

Bascoul, G, et al, "Time Resolved Imaging: From logical sates to events, a new and efficient pattern matching method for VLSI analysis", Proceedings of the 22th European Symposium on the Reliability of Electron Devices, Failure Physics and Analysis; Microelectronics Reliability, vol. 51, issues 9-11; Sep.-Nov. 2011, pp. 1640-1645.

*Primary Examiner* — King Poon
*Assistant Examiner* — Vincent Peren

(57) ABSTRACT

A display controller device for processing image data has a data processor for generating a display signal. The device has a writeback unit having an input coupled to the display signal and an output coupled to a debug interface. The writeback unit has a slice controller for defining a set of slices of the image and consecutively selecting slices of the set, and a slice selector for sampling pixel data from a selected slice. A slice buffer is coupled between the slice selector and the debug output for temporarily storing the selected pixel data. The slice controller transfers the selected pixel data to the debugger and subsequently selects a next slice until all slices of the set have been transferred. The debug system receives the slices and regenerates and displays the image.

20 Claims, 4 Drawing Sheets

(51) Int. Cl.
*G09G 3/20* (2006.01)
*G09G 5/00* (2006.01)
*G06F 3/14* (2006.01)

(52) U.S. Cl.
CPC ........... *G09G 5/12* (2013.01); *G09G 2330/12* (2013.01); *G09G 2340/10* (2013.01)

(56) References Cited

U.S. PATENT DOCUMENTS

| 8,290,109 B2 | 10/2012 | Li |
| 2008/0133167 A1 | 6/2008 | Fleury et al. |
| 2013/0064334 A1 | 3/2013 | Rofougaran |

FOREIGN PATENT DOCUMENTS

| WO | 2006/082555 A1 | 8/2006 |
| WO | WO2009/141684 A2 | 11/2009 |

* cited by examiner

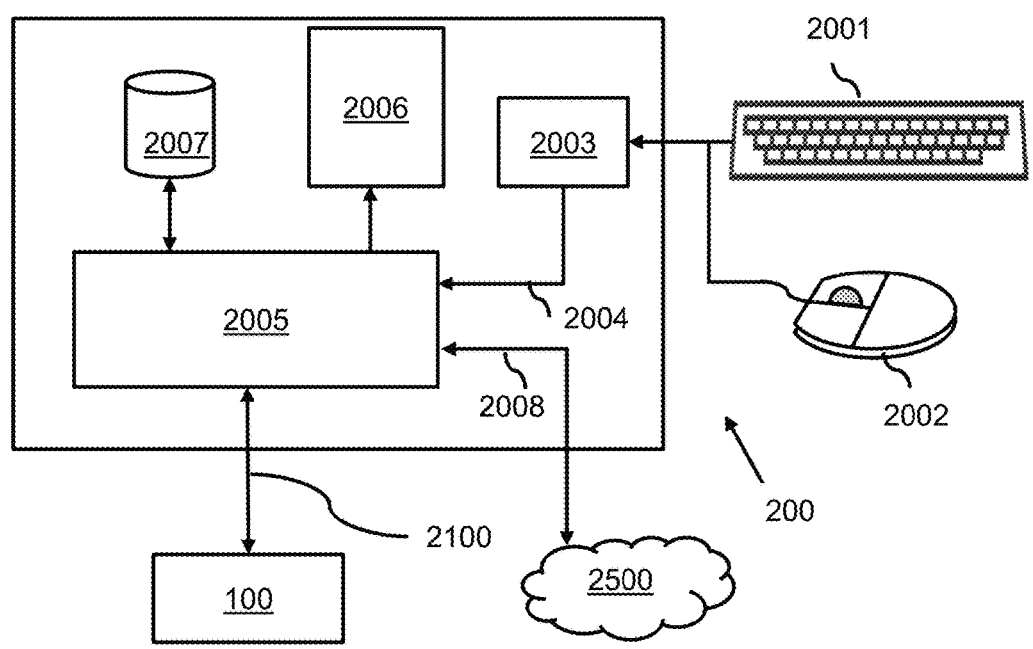
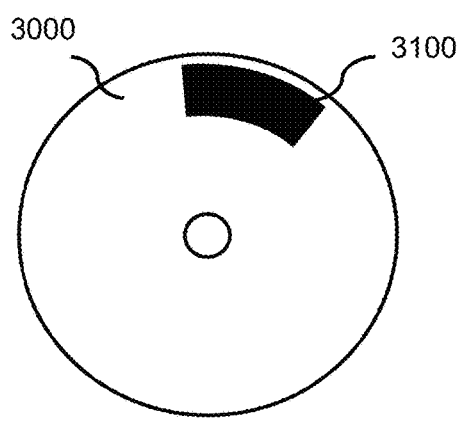
Fig. 5

DISPLAY CONTROLLER DEVICE HAVING A DEBUG INTERFACE

CROSS REFERENCE TO RELATED APPLICATION(S)

The present application claims priority to International Patent Application No. PCT/IB2014/002106, entitled "DISPLAY CONTROLLER DEVICE HAVING A DEBUG INTERFACE," filed on Sep. 5, 2104, the entirety of which is herein incorporated by reference.

FIELD OF THE INVENTION

This invention relates to a display controller device having a debug interface. The invention further relates to debug system and a method for accessing a display controller. The invention further relates to an integrated circuit comprising at least one display controller device. The invention further relates to a driver information system comprising the display controller device.

BACKGROUND OF THE INVENTION

The international patent application WO 2009/141684 describes a display controller for use in a car application. The display controller generates a display signal representing an image to be displayed. Vehicle information and entertainment systems and consumer entertainment devices may employ sophisticated graphical schemes. A vehicle information and entertainment system may for instance display both safety relevant, such as the vehicle speed and engine temperature, and not safety relevant information, such as video or navigation information at the same time. During development of systems such display controllers need to be tested and the operation and functions need to be verified in a development process usually called debugging. Thereto such display controllers are provided with a debug interface to be coupled to a debug system, for example a computer having an appropriate hardware debug interface.

A drawback of such display controller devices is that the display signal needs to be analyzed during debugging. Thereto the actual contents of the display signal need to be captured. Capturing such high data rate signals requires substantial debugging hardware. Thereto such display controller may be provided with a writeback function to internally capture the display signal in a memory, which memory can be accessed by the debug system. However, such a memory needs to be relatively large and fast, and increases the complexity of the display controller.

SUMMARY OF THE INVENTION

The present invention provides a display controller device, a debug system, a method of accessing a display controller device, a driver information system, an integrated circuit, a computer program product and a non-transitory tangible computer readable storage medium as further described in the accompanying claims.

Specific embodiments of the invention are set forth in the dependent claims. Aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

FIG. 5 shows a computer readable medium comprising a computer program product.

Elements in the figures are illustrated for simplicity and clarity and have not necessarily been drawn to scale. In the figures, elements which correspond to elements already described may have the same reference numerals.

DETAILED DESCRIPTION OF THE PREFERRED EMBODIMENTS

Figure 1:
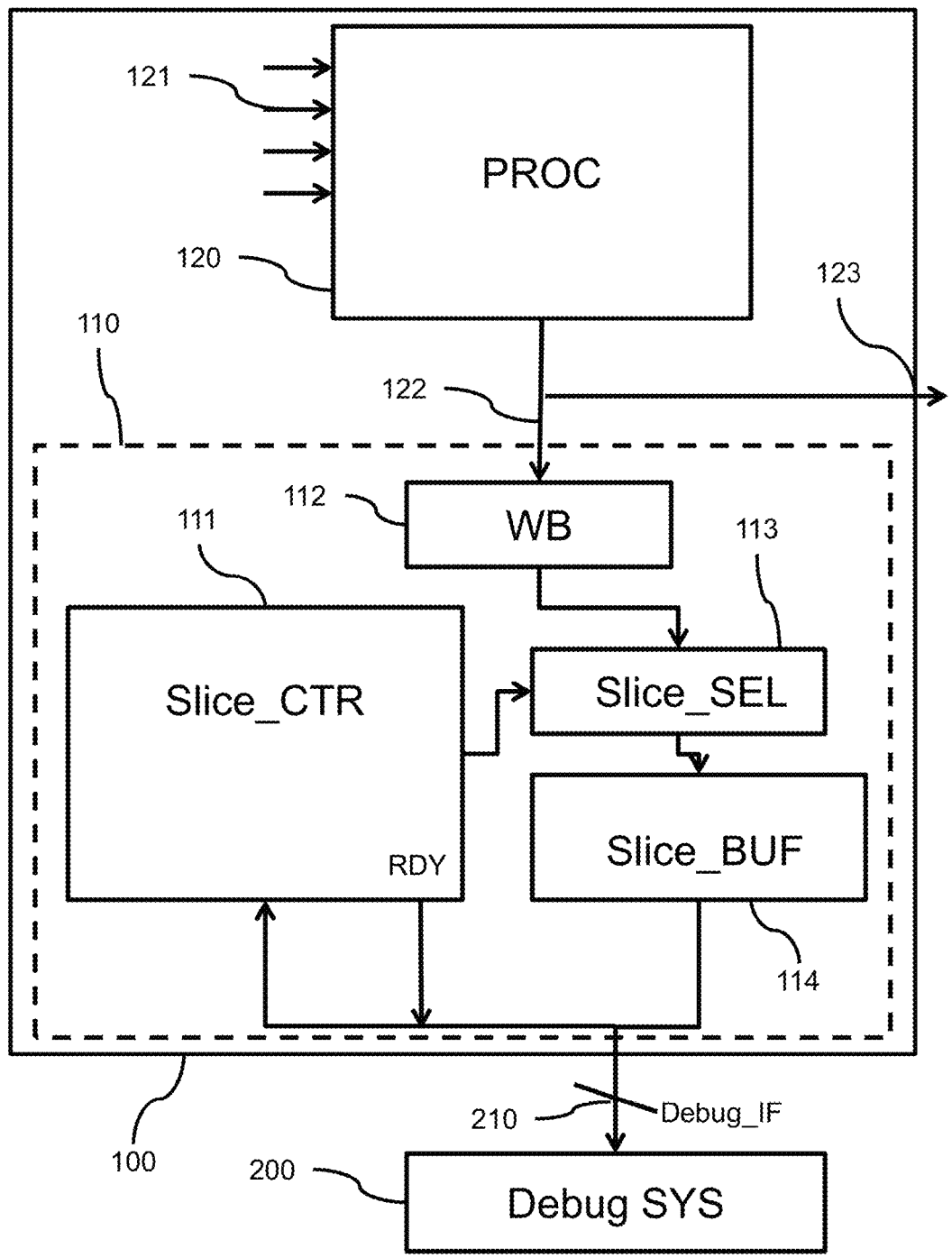
FIG. 1 shows an example of a display controller device having a debug interface.

In the examples in this document the display controller device is used in a car application called a driver information system, but the display controller device may be used in any other field requiring a display signal for displaying images or video. Examples of the present invention will now be described with reference to an example of display controller for displaying image data. It is noted that such a display controller may be part of a larger graphical processing unit (GPU) or a dedicated display controller, or any other image processing system, such as a sprite based display processor. So it will be appreciated that the present invention is not limited to the specific processing architecture herein described with reference to the accompanying drawings, and may equally be applied to alternative architectures.

In automotive instrument clusters cost efficient solutions are required. A resource driving cost is the amount of memory required in such a system. To allow a memory efficient implementation a frame buffer, which requires a large memory area for holding the entire screen content, is avoided while using a number of smaller buffers each representing, for example, an element shown on the screen. This approach, usually called sprite based, allows selecting the most compact representation of the element without degrading the visual quality. It also allows re-using the image several times when shown multiple times on the screen. Such a sprite based approach is usually implemented by a special display controller constructed to read the memory content of required display elements on the fly and to generate the resulting image for each refresh of the display.

Cost efficient display controllers, e.g. the sprite-based display controllers as outlined above, impose a limitation that there may not be a complete frame buffer that can be accessed by a debugger system for inspection during the development or debug phase. The device may actually not even have enough memory space to store a complete image, which may make debugging or automated testing difficult. A debug system might be constructed to capture the data at the data lines going to the display, this however requires expensive equipment increasing the barrier to use such display controllers. Now follows a description of a display controller and debug system to regenerate the display image slice by slice and transferring slices via a relatively low-speed debug port to enable the debug system to regenerate the image from the received slices, e.g. for debugging purposes. Such regenerated image may also be called a target image, which target image may be equal to the original output image, may be a part of the output image or may have a lower resolution than the output image, etc.

In this document, a slice represents a subset of pixels taken from the output image and to be transferred as a unit to the debug system where the target image is reconstructed from multiple slices. For example, the slice may be a set of consecutive pixels of consecutive lines or columns of the output image. In the debug system such combined slices, when used for regenerating the target image, may increasingly fill the target image by adding parts of the image. A slice may also be a sampling of non-consecutive pixels of an area of the output image. For example, a slice may be a subset of pixels of an image area at a pattern of sample positions. Subsequent slices may then be further samplings of non-consecutive pixels of the same area, e.g. sampled at new pixel sample positions in between earlier sample positions. In the debug system such combined slices may increasingly fill in details in the target image, i.e. increasing the perceived resolution.

FIG. 1 shows an example of a display controller device having a debug interface. A display controller device 100 is coupled to a debug system 200 via a debug interface 210. The display controller device has a data processor 120 for processing image data 121 and generating a display signal 122 representing an image. A display output 123 is provided for connecting the display signal to a display. The display control has a writeback unit 110 that has a writeback input WB 112 coupled to the display signal and an output coupled to the debug interface 210. The writeback unit has a slice controller 111 for defining a set of slices of the image and consecutively selecting slices of the set. The writeback unit also has a slice selector 113 coupled via a control input to the slice controller for selecting image pixel data from a selected slice. The writeback unit also has a slice buffer 114 coupled between an output of the slice selector and the debug interface for temporarily storing the selected pixel data. The pixel data is stored until the selected pixel data of the selected slice has been transferred via the debug interface. The slice controller is arranged to detect whether all requested data of a slice is stored, and then to transfer the selected pixel data of the selected slice to the debug system. A ready signal RDY may indicate that a respective slice has been selected and stored, so being ready for transfer to the debug system. The RDY signal may be coupled via a dedicated output to the debug system, or may be made available in a register that is accessible for the debug system. Subsequently to the transfer the slice controller select a next slice, which operations are repeated until all slices of the set have been selected and transferred.

The operation of the writeback unit may involve the following elements. A slice control interface may be provided as programming interface of the slice logic. Here the debug system, e.g. automatically or the operator of the debug system, may select which area of the image to capture next. The selection of pixel data of the selected slice is performed by the slice selector, which may be implemented by logic circuits that select data from the display signal based on the settings in the slice controller.

In an embodiment the slice selector is arranged for selecting pixels of the output image as follows. The selected pixels may be a set of consecutive pixels of consecutive lines or columns of the output image. In the debug system such combined slices, when used for regenerating the target image, may increasingly fill the target image by adding parts of the image. The selected pixels may also be a sampling of non-consecutive pixels of an area of the output image. For example, the selected pixels constituting the slice may be a subset of pixels of an image area at a pattern of sample positions. Subsequent slices may then be further samplings of non-consecutive selected pixels of the same area, e.g. sampled at new pixel sample positions in between earlier sample positions.

The relevant pixels of the slice are selected, temporarily stored in the slice buffer and transferred to the debug system. The slice buffer may be a transfer buffer, for example a FIFO, which is filled with the relevant pixel data as selected by the slice selector using slice control settings. The transfer buffer may be formed by assigning, during a required writeback operation, a general purpose or debug buffer, such as a trace buffer for debugging. By the writeback operation the generated output image is captured in slices and captured slices are stored on-chip to a buffer which data is subsequently transferred via a debug connection to a debugger system.

In an embodiment, the slice controller is constructed to force the data processor to keep the display signal representing the same image until all slices of the set have been selected and transferred. For example, the processing of new image data may be temporarily interrupted via a control signal to the data processor 120 until all slices have been transferred. It is noted that selecting and transferring the set of slices may take some time. To achieve a consistent set of slices during the debug/automated test situation the image content is kept stable for some time so all slices that are captured and transferred represent a same image.

In an embodiment, the slice controller is constructed to receive commands from a debug system. The commands may include a slice setup command for defining the set of slices of the image. The slice controller is constructed for executing the setup and slice definition according to the command. The slice controller may be constructed to receive an area command from the debug system. The area command may define an area of the image that is to be captured next via the set of slices. Instead of capturing the full image, said area is subdivided in slices. Reducing the total amount of data improves the speed of capturing and transferring the pixel data of the set of slices. The area command may define the area of the image by at least one of an X position, an Y position, a width, a height.

In an embodiment, the slice controller is constructed to receive a transfer setup command from the debug system, the transfer setup command defining parameters of the transfer the selected pixel data of the selected slice. The slice controller is constructed for executing the transfer setup command according to the parameters of the transfer, such as speed, number of bytes, burst size, etc.

In an embodiment, the slice controller is constructed to provide at least one status signal to a debug system. For example, the slice controller is constructed to provide a transfer status signal indicating that the slice buffer is ready to transfer the selected pixel data of the selected slice. Other status signals may include a signal that the data processor 120 is halted, or in a specific state, or the number of the slice that is currently being captured. The slice controller is constructed to provide the at least one status signal in a register that is accessible for the debug system. The status register may be a dedicated debug status register or a shared, more general register also containing other status or command bits.

The debug interface of the display controller may be implemented by a few dedicated input/output connectors of pins, so as to provide a low-speed debug interface. In an embodiment, the display controller device comprises a boundary scan interface for testing the device, and the debug interface is comprised in the boundary scan interface, for example according to the JTAG standard.

The display controller device may be implemented as an integrated circuit. Such an integrated circuit may also contain several display controller devices as described above. Also a driver information system may contain at least one display controller device as described above.

Figure 2:
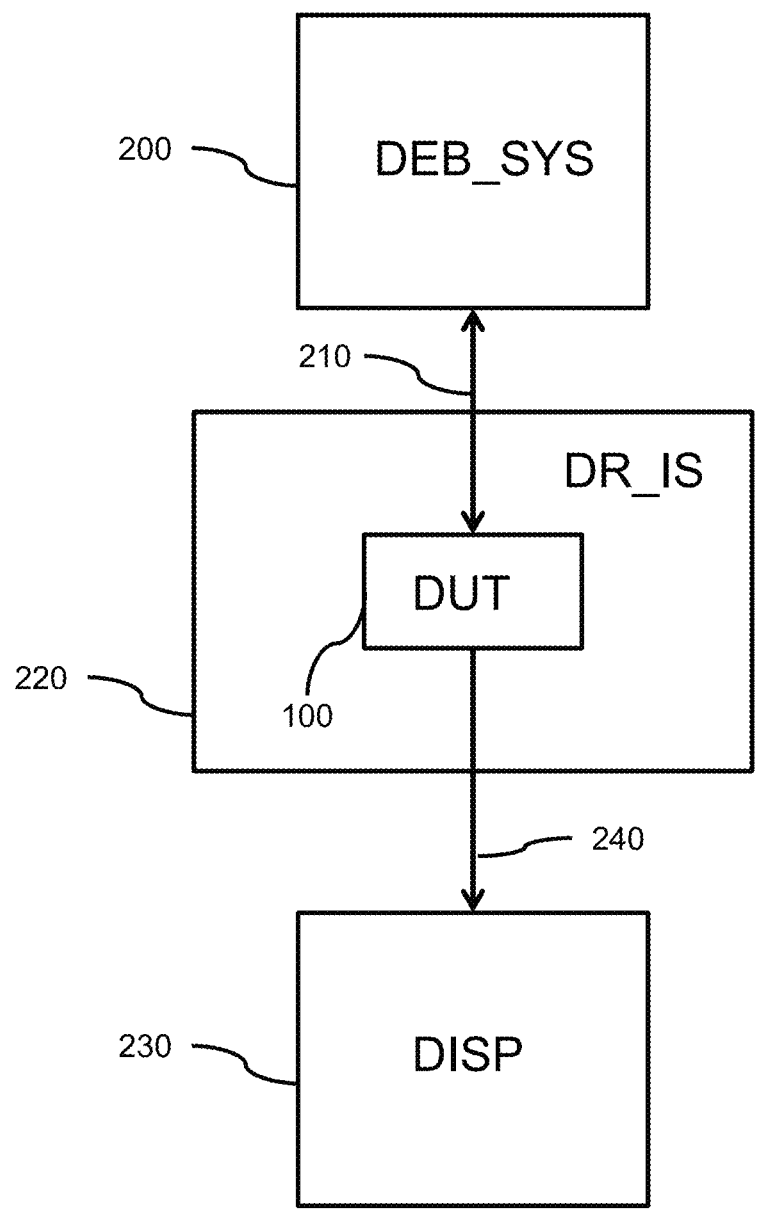
FIG. 2 shows an example of a debug system coupled to a driver information system using a display controller device.

FIG. 2 shows an example of a debug system coupled to a driver information system using a display controller device. A debug system 200 is shown coupled to an application system 220, for example a driver information system DR_IS. The application system may be any hardware circuit or dedicated test circuit, which provides operational conditions like supply power for the display controller 100. The application system 220 contains a display controller 100, also called device under test DUT, which is coupled via a debug interface 210 to the debug system 200. The display controller provides a display signal 240 that may be coupled to a display DISP 230, for example a prototype of a dashboard information display. However, during development and testing the actual intended target display may not be available. Due to the writeback operation of the writeback unit as provided in the display controller the debug system is enabled to receive and regenerate the image as represented by the display signal 240.

The debug system 200 has a debug system interface for coupling to a debug interface of a device as described above, such as a display controller. The debug system may include a display for displaying an image, for example an interface to be coupled to an external interface. The system further has a debug processor arranged to receive a set of slices of the image and display the image by transferring selected pixel data of a respective slice and subsequently receiving a next slice until all slices have been transferred, and regenerating the image from the received slices.

The operation of the debug system may involve the following elements. To gather the complete (fragmented) frame buffer the debugger host may first set up the slice control by providing a number of settings to the slice controller, e.g. via the debug interface. The settings define which part of the image is to be selected and transferred. The debugger host may make sure that the selected frame buffer segments fully fit into the Slice Buffer. Alternatively, the slice controller may just receive a command to select a part of the picture, or the whole picture, and locally determine the size of the slices and the necessary numbers. The slice buffer may have a memory capacity for storing two slices, so a new slice can be selected while the previous one is being transferred to the debugger.

After defining the slices the actual capture will be performed. The following steps may be repeated until the entire image (or selected part of the image) has been transferred to the debugger host. After starting the slicing operation wait until the slice controller indicates that the slice buffer is ready. This may be implemented by a dedicated signal to the debugger as illustrated in the block diagram or by a register bit in the slice controller that may be checked by the debugger. For slow speed debug connections this step might be replaced by taking into account a time period appropriate for selecting a respective further slice. When storing is ready the debugger may read out the slice buffer.

The display controller and debug system as proposed may be used during development and test of application software for any device, e.g. a system on chip SoC that drives a display. The system allows analyzing the entire image frame content even in cases where limited memory is available in the device and/or where the device has a slow debug connection. A typical application of this system, i.e. a driver information unit, is shown in FIG. 2. During a development phase the driver information system is connected to a development PC which performs applications like a debugger or an automated test. The writeback system allows to access the entire image sent periodically to the display using the debugger or development PC and so provides full insight into the generated images. The fact that the images are captured digitally also allows matching them against known-good reference data. The writeback system is effective for cases when there is not enough memory to constitute a full frame buffer in the memory, for example in a sprite based display controller. The European Patent Application EP 0661684 A2 "Display of a sprite in a computer system" describes an example of such a sprite based display controller.

In an embodiment, the debug processor is arranged to force the data processor to keep the display signal representing the same image until all slices of the set have been selected and transferred. For example, the processing of new image data may be temporarily interrupted until all slices have been received. It is noted that selecting and transferring the set of slices may take some time. So the slices may not be taken from the same point in time. Usually the content of the application does usually not change that quickly. To achieve a consistent set of slices during the debug/automated test situation the image content may be kept stable for some time so it all slices can be captured and transferred.

In an embodiment the debug processor is arranged transfer commands to the slice controller. The commands may include a slice setup command for defining the set of slices of the image. The structure and contents of the individual slices may now be determined by the debug system. The commands may include an area command defining an area of the image that is to be captured next via the set of slices. Instead of the whole display area only part of the display area may be captured. This partial area is subsequently subdivided in slices to be selected and transferred. The commands may include a transfer setup command defining parameters of the transfer the selected pixel data of the selected slice. The debug system is enabled to control the transfer of the pixel data via the debug interface.

In an embodiment, the debug system is arranged to receive at least one status signal from the slice controller. The debug system is enabled to monitor the status of the writeback process. The debug system may be arranged to receive a transfer status signal from the slice controller, the transfer status signal indicating that the slice buffer is ready to transfer the selected pixel data of the selected slice. The debug system may be arranged to receive at least one status signal from the slice controller via a register in the display controller device that is accessible for the debug system.

In an embodiment, the debug system comprises a boundary scan interface for testing the device, and the debug interface is comprised in the boundary scan interface.

Figure 3:
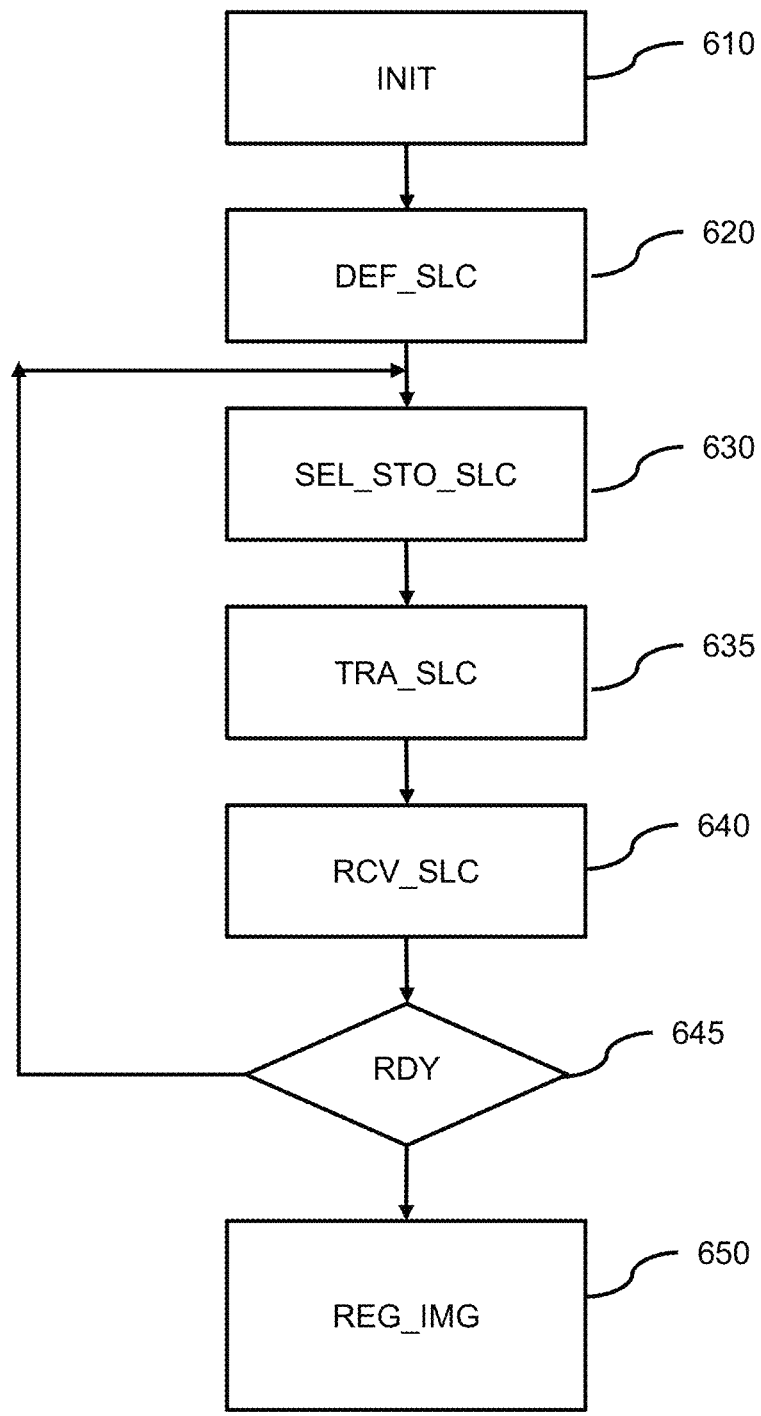
FIG. 3 shows an example of a method of accessing a display controller device, FIG. 4 schematically shows an exemplary debug system.

FIG. 3 shows an example of a method of accessing a display controller device. The display controller device has been described above, with reference to FIGS. 1 and 2. The method starts with block INIT 610 by initiating the system and powering the display controller. In a next stage the method communicates with the slice processor in the display controller to set up the parameters for image data to be retrieved from the display output as generated by the display controller. Thereto, in stage DEF_SLC 620 a set of slices of the image is defined, and the slice processor is instructed to apply the set of slices and consecutively select slices of the set. For the selected slice, the display processor in a stage SEL_STO_SLC 630 selects pixel data from a selected slice and temporarily stores the selected pixel data until the selected pixel data of the selected slice has been transferred via the debug interface. Next in a stage TRA_SLC 635 the selected pixel data of the selected slice is transferred to the debug system and the display processor subsequently selects a next slice until all slices of the set have been selected and transferred, as indicated by the decision stage RDY 645. While the slices are transferred from the display controller, the method receives the set of slices of the image and then displays the image. Thereto the method, in the debug system in stage RCV_SLC 640, involves receiving selected pixel data of a respective slice and subsequently receiving a next slice until all slices have been received. In practice, the process of transferring the data of a slice and proceeding to the next slice may be controlled by the slice processor in the display controller, or by the debug system based on status signals exchanged with the display controller. Finally, in a stage REG_IMG 650 when all slices constituting the image have been transferred, the image is regenerated from the received slices and displayed for the operator of the debug system. The above stages are repeated as long as the image is required to be displayed, or a new definition of slices is set in stage DEF_SLC 620.

FIG. 4 schematically shows an exemplary debug system 200 having a programmable processor 2005. The debug system is shown to be a personal computer, but may be any type of suitable debug system. The programmable processor may comprise one or more software components for performing the operations as described above. The debug system has a debug interface 2100 to be coupled to a display controller 100 as described above, for example according to the JTAG standard for boundary scan. Joint Test Action Group (JTAG) is the common name for the IEEE 1149.1 Standard Test Access Port and Boundary-Scan Architecture. It was initially devised by electronic engineers for testing printed circuit boards using boundary scan and is still widely used for this application. JTAG is also widely used for IC debug ports. Many modern processors and controller devices implement JTAG. The debug system is constructed for embedded systems development and communicates with chips with JTAG to perform operations like single stepping and breakpointing.

The debug system 200 further comprises a storage unit 2007, a user input 2003 and a display 2006, which may be a build-in display or an external display. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods as described above, to receive user data and user instructions 2004, to present visual information on the display 2006 such as the image regenerated from the slices. The processor 2005 is arranged to cooperate with the storage unit 2007, allowing storing and retrieving information on the storage unit 2007. The debug system 2000 may further comprise a communication channel 2008 allowing the processor 2005 to connect to an external cloud 2500 for communicating with other devices in the cloud. The external cloud may e.g. be the Internet. The processor 2005 may be capable to read, e.g. using a data I/O device such as an optical disc drive, a computer readable medium comprising a program code. The computer readable medium may comprise a computer program product comprising instructions for causing the debug system 2000 to perform a method of accessing as described with FIG. 3 above.

FIG. 5 shows a computer readable medium 3000 comprising a computer program product 3100, the computer program product 3100 comprising instructions for causing a processor apparatus to perform a method of accessing. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 5 as an optical disc, the computer readable medium 3000 may be any suitable computer readable medium, such as a hard disk, solid state memory, flash memory, etc., and may be non-recordable or recordable.

The medium 3000 is an example of a non-transitory tangible computer readable storage medium comprising data loadable in a programmable apparatus. The data represents instructions executable by the programmable apparatus. The instructions comprise one or more controller instructions for controlling the display controller to define a set of slices of the image and consecutively selecting slices of the set, select pixel data from a selected slice, temporarily store the selected pixel data until the selected pixel data of the selected slice has been transferred via the debug interface, and transfer the selected pixel data of the selected slice and subsequently selecting a next slice until all slices of the set have been selected and transferred. The instructions further comprise one or more receiver instructions for receiving the set of slices of the image by transferring selected pixel data of a respective slice and subsequently receiving a next slice until all slices have been received. The instructions further comprise one or more display instructions for displaying the image by regenerating the image from the received slices.

In the foregoing specification, the invention has been described with reference to specific examples of embodiments of the invention. It will, however, be evident that various modifications and changes may be made therein without departing from the broader spirit of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Furthermore, the units and circuits may be suitably combined in one or more semiconductor devices.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A display controller device for processing image data, the display controller device comprising a data processor for generating a display signal representing an image, a display output for connecting the display signal to a display, a debug interface and a writeback unit having an input coupled to the display signal and an output coupled to the debug interface, the writeback unit comprising:
   a slice controller for defining a set of slices of the image and consecutively selecting slices of the set, wherein the slice controller is arranged to receive commands from a debug system, the commands comprising a slice setup command for defining the set of slices of the image,
   a slice selector coupled to the slice controller for selecting pixel data from the display signal for a selected slice,
   a slice buffer coupled between the slice selector and the debug interface for temporarily storing the selected pixel data until the selected pixel data of the selected slice has been transferred via the debug interface,
   the slice controller being arranged to transfer the selected pixel data of the selected slice and subsequently select a next slice until all slices of the set have been selected and transferred.

2. The display controller device as claimed in claim 1, wherein the slice controller is arranged to force the data processor to keep the display signal representing the same image until all slices of the set have been selected and transferred.

3. The display controller device as claimed in claim 1, wherein the slice controller is arranged to receive a transfer setup command from the debug system, the transfer setup command defining parameters of the transfer the selected pixel data of the selected slice.

4. The display controller device as claimed in claim 1, wherein the device comprises a boundary scan interface for testing the device, and the debug interface is comprised in the boundary scan interface.

5. The display controller device as claimed in claim 1, wherein the slice controller is arranged to receive an area command from the debug system, the area command defining an area of the image that is to be captured next via the set of slices.

6. The display controller device as claimed in claim 5, wherein the area command is defining the area of the image by at least one of an X position, an Y position, a width, a height.

7. The display controller device as claimed in claim 1, wherein the slice controller is arranged to provide at least one status signal to the debug system.

8. The display controller device as claimed in claim 7, wherein the slice controller is arranged to provide a transfer status signal indicating that the slice buffer is ready to transfer the selected pixel data of the selected slice.

9. The display controller device as claimed in claim 7, wherein the slice controller is constructed to provide the at least one status signal in a register that is accessible for the debug system.

10. The display controller device as claimed in claim 1, wherein the debug interface of the display controller device is provided for coupling to the debug system comprising:
   a debug system interface for coupling to the debug interface of the display controller device,
   the display for displaying the image, and
   a debug processor arranged to receive the set of slices of the image and display the image by
      receiving selected pixel data of a respective slice and subsequently receiving the next slice until all slices have been transferred, and
      regenerating the image from the received slices.

11. The display controller device as claimed in claim 10, wherein the debug processor is arranged to force, via the debug interface, the data processor in the display controller device to keep the display signal representing the same image until all slices of the set have been selected and transferred.

12. The display controller device as claimed in claim 10, wherein the debug processor is arranged to transfer commands to the slice controller, the commands comprising at least one of
   a slice setup command for defining the set of slices of the image;
   an area command, the area command defining an area of the image that is to be captured next via the set of slices;
   a transfer setup command, the transfer setup command defining parameters of the transfer the selected pixel data of the selected slice.

13. The display controller device as claimed in claim 10, wherein the debug system is arranged to receive at least one status signal from the slice controller,
   the at least one status signal from the slice controller being received via a register in the display controller device that is accessible for the debug system.

14. The display controller device as claimed in claim 10, wherein the debug system comprises a boundary scan interface for testing the device, and the debug interface is comprised in the boundary scan interface.

15. A method of accessing a display controller device, the method comprising:
   defining a set of slices of an image and consecutively selecting slices of the set,
   selecting pixel data from a display signal representing the image for a selected slice,
   temporarily storing the selected pixel data until the selected pixel data of the selected slice has been transferred via a debug interface,
   transferring the selected pixel data of the selected slice and subsequently selecting a next slice via the debug interface until all slices of the set have been selected and transferred, and
   at a debug system, receiving the set of slices of the image by:

receiving selected pixel data of a respective slice and subsequently receiving the next slice until all slices have been received, regenerating the image from received slices, and displaying the image by regenerating the image from the received slices.

16. A writeback unit comprising:

a slice controller for defining a set of slices of an image and consecutively selecting slices of the set, wherein the slice controller is arranged to receive commands from a debug system, the commands comprising a slice setup command for defining the set of slices of the image, a slice selector coupled to the slice controller for selecting pixel data from a display signal representing the image for a selected slice, a slice buffer coupled between the slice selector and the debug interface for temporarily storing the selected pixel data until the selected pixel data of the selected slice has been transferred via the debug interface, the slice controller being arranged to transfer the selected pixel data of the selected slice and subsequently select a next slice until all slices of the set have been selected and transferred.

17. The display controller device as claimed in claim 16, wherein the slice controller is arranged to force the data processor to keep the display signal representing the same image until all slices of the set have been selected and transferred.

18. The display controller device as claimed in claim 16, wherein the slice controller is arranged to receive a transfer setup command from the debug system, the transfer setup command defining parameters of the transfer the selected pixel data of the selected slice.

19. The display controller device as claimed in claim 16, wherein the slice controller is arranged to receive an area command from the debug system, the area command defining an area of the image that is to be captured next via the set of slices.

20. The display controller device as claimed in claim 19, wherein the area command is defining the area of the image by at least one of an X position, an Y position, a width, a height.

* * * * *